July 28, 1925.
S. MINIERE
RECEPTACLE
Filed June 4, 1923
1,547,662
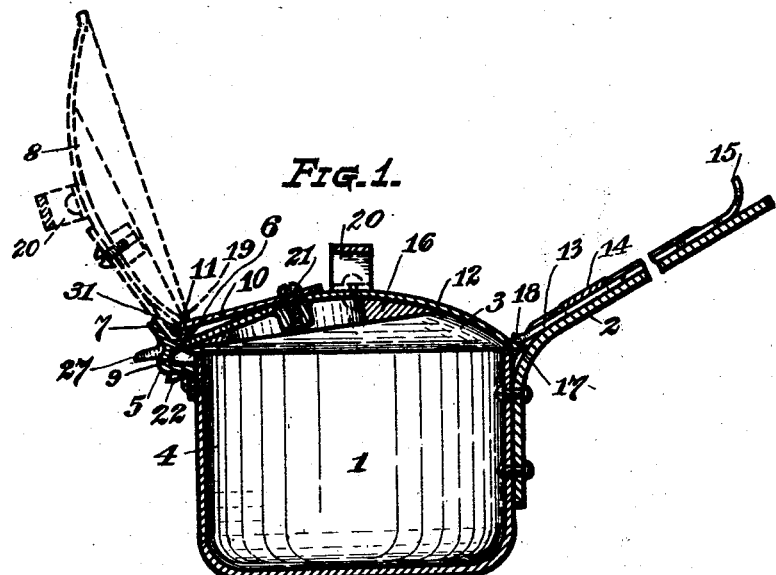
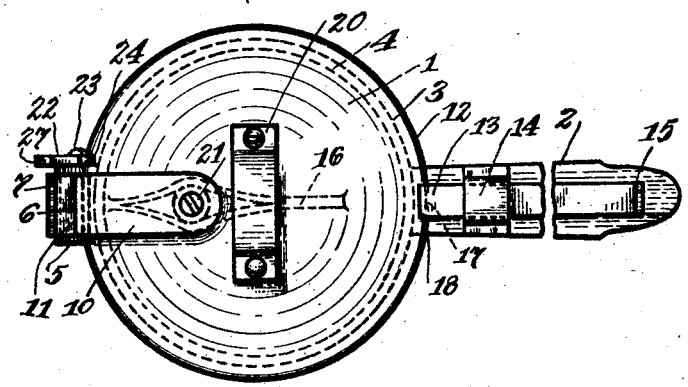
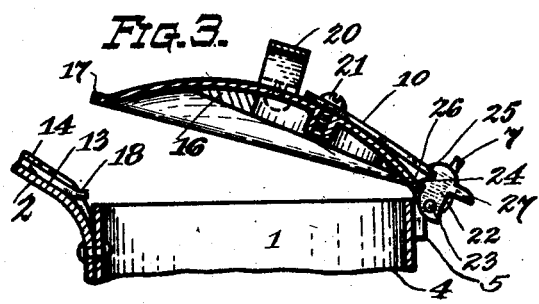
SALVATORE MINIERE,
INVENTOR,
BY *William A. Kittle,*
ATTORNEY.

Patented July 28, 1925.

1,547,662

UNITED STATES PATENT OFFICE.

SALVATORE MINIERE, OF PITTSBURGH, PENNSYLVANIA.

RECEPTACLE.

Application filed June 4, 1923. Serial No. 643,451.

*To all whom it may concern:*

Be it known that I, SALVATORE MINIERE, a citizen of the United States of America, residing at Pittsburgh, in the county of Allegheny and State of Pennsylvania, have invented certain new and useful Improvements in Receptacles, of which the following is a specification.

The present invention relates to receptacles having detachable covers, and has for its object the provision of a means whereby the cover may be held in a plurality of partially opened, fully opened and closed positions. Said means is particularly useful when the receptacle is in a heated condition as will be explained hereinafter. The means used is set out more specifically in the following specification, and ordinary receptacles may be with slight alterations adapted for use with the present invention, which is simple in construction, easily manufactured, and readily applied to such receptacles such as cooking utensils, pots or the like.

In the drawings forming part of this specification, I have shown fully the nature of the means used, to accomplish the desired results, constructed according to the best mode I have so far devised for the purpose in hand.

Figure 1, of the drawings is a central vertical section through a receptacle, and illustrating my invention.

Figure 2 is a top plan view of Figure 1.

Figure 3 is a partial central section of the receptacle shown in Figure 1, taken from the reverse side thereof.

In the drawings the numeral 1 indicates a receptacle such as an aluminum pot used for cooking purposes, having a handle 2, and a detachable cover 3 as shown. The body portion 4 of the receptacle is provided with a metal casting 5, having a pintle 6, and an upwardly and outwardly extending stop 7 adapted to engage the cover 3, when same is in fully opened position 8 shown dotted in Figure 1.

The cover 3 has an extension 9 which is in contact with the under side of the pintle 6, about which the cover 3 revolves when being opened as is readily appreciated. In the drawing said cross-bar is shown substantially rectangular in cross-section as seen in Figure 1, and it is seen that when the cover 3 is closed the spring 10 is under tension, due to the cooperation of the upper edge of extension 9 of the cover with the lower side of pintle 6. The end of flat spring 10 is secured by the screw 21 to the cover 3, while the opposite end 11 is somewhat enlarged at 31 and in resilient engagement with the pintle 6, so that the pintle is held in pressed contact between the extension 9 of the cover 3, and the spring end 11. It is evident that the spring 10 being of sufficient strength will have a tendency to lift the cover 3 from its closed position 12 as shown in Figure 1 unless the cover is secured by means of the end of the slidable bar 13 which is mounted on the handle 2 as shown. The said bar 13 is held in position on the handle 2 by means of the cross-strip 14, and bar 13 is readily operated longitudinally by means of the upturned end 15, as is at once understood.

The cover 3 is also provided with a divided stiffening rib 16 and when said cover is revolved the center of revolution is at the center of the pintle 6. It is evident that as soon as the edge 17 of the cover 3 is released by withdrawing the end 18 of the slidable bar 13 therefrom, that unless otherwise acted upon, the cover 3 will at once assume the position 8 shown in the Figure 1 of the drawing, with the end 11 of the spring 10 held between the pintle 6 and the upward extension or stop 7, while the extension 9 of the cover 3 takes the position 19, still in compressive relation with the pintle 6. While the cover 3 is in position 8, it is securely held in this opened position until removed by using the handle 20 and withdrawing the extension 9 and the spring 10 from its compressive contact with the pintle 6, which may be readily accomplished if it is desired to entirely remove the cover from the receptacle.

Mounted on the metal casting as shown in the Figure 3 is the pivoted pawl 22 which is pivoted at 23, and provided with one or more teeth 24, 25, which are adapted to engage the edge 26 of the cover 3 when the latter assumes partially opened positions, such as that illustrated in Figure 3.

It is evident that when the tooth 24 is engaged with the rim 26, that the cover 3 is automatically held in position, the spring 10 tending to open the cover, while the tooth 24 of the pawl 22 resists such opening movement, in which event the cover is held in partially opened position as desired. The same is true when it is desired to open the cover or lid 3 to a higher position, the tooth 25 of the pawl 22 engages the rim, and resists further opening movement. The small extension 27 furnishes a thumb-hold by which the pawl 22 is readily released from engagement with the cover, and it is noted that the pawl is made so that the portion to the right of the pivot as seen in Figure 3 is slightly heavier than the portion to the left thereof, so that the pawl will not normally engage the cover 3 unless operated by hand, and placed in direct engagement therewith. Attention is further directed to the fact that once the pawl is in engaged position as in Figure 3, by merely touching the extension 27 of the pawl 22, the latter is disengaged, and the cover will " fly " open to its fully opened position, this is important when the cover and receptacle are in a highly heated condition, and is a very convenient feature of the operation of the device.

I claim:—

1. A receptacle having a pintle mounted thereon, a cover having an extension engaging one side of said pintle, and a spring on the cover having an enlarged end engaging the opposite side of the pintle for automatically lifting the cover to any one of a number of partly open positions, or to a fully open position.

2. A receptacle having a metal casting thereon, a pintle in the casting, and upwardly and outwardly extending stop formed in the casting, a cover having an extension and a spring in compressive engagement with said pintle, and means for holding the receptacle cover in a number of positions.

3. A receptacle having a pintle mounted thereon, a cover having an extension in pressed contact with one side of said pintle, a spring on the cover in resilient contact with the opposite side of said pintle, and means for holding said cover in any one of a number of partly open positions, or in fully open position.

4. A receptacle having a pintle mounted thereon, a cover having an extension and a spring in compressive engagement with said pintle, and a pivoted pawl on the receptacle adapted to engage the receptacle cover and hold same in partially opened position.

5. A receptacle having a pintle mounted thereon, a cover having an extension and a spring in compressive engagement with said pintle, and upwardly and outwardly extending stop on the receptacle body, adapted to engage the receptacle cover and hold same in fully opened position.

6. A receptacle having a pintle mounted thereon, a cover having an extension and a spring in compressive contact with said pintle, a pivoted pawl mounted on the receptacle body adapted to engage the receptacle cover and hold same in a partially opened position, and upwardly and outwardly extending stop on the receptacle body, adapted to engage the said cover and hold same in fully opened position.

7. A receptacle having a pintle mounted thereon, a cover having an extension and spring in compressive engagement with said pintle, a pivoted pawl on the receptacle body, adapted to engage and hold the cover in partially opened position, a handle on the receptacle having a slidable bar mounted thereon adapted to engage and hold the cover in closed position, and means for holding the said cover in fully opened and readily removable position.

8. A receptacle having a metal casting mounted thereon, a pintle in the casting, a cover having an extension and spring in compressive relation with said pintle, a pivoted pawl mounted on the side of the metal casting adapted to engage the receptacle cover when in partially opened position, an upwardly and outwardly extending stop formed in the aforesaid metal casting for holding the receptacle cover in fully opened position, and means for securing the cover in fully closed position.

9. A receptacle having a cover, automatic lifting means for said cover, adapted to raise the same to any one of a number of partly open positions or fully open position, and means for holding the cover in the various positions.

10. A receptacle having a detachable cover, automatic means for lifting said cover to a plurality of partly open positions, and a pivoted pawl on the receptacle adapted to engage the receptacle cover and hold same in any one of the partially open positions.

11. A receptacle having a cover, automatic lifting means for opening said cover, means for holding said cover in any one of a plurality of partially open positions, and means for locking the cover in closed position.

In testimony whereof I affix my signature.

SALVATORE MINIERE.

Witnesses:
WILLIAM A. HIRTLE,
CORA J. NAUGLE.